United States Patent
Shah et al.

(10) Patent No.: US 8,835,009 B2
(45) Date of Patent: Sep. 16, 2014

(54) ADHESIVE COMPOSITIONS

(75) Inventors: Pankaj Vinubhai Shah, Crystal Lake, IL (US); Kevin Miyake, Tower Lakes, IL (US)

(73) Assignee: Rohm and Haas Company, Philadelphia, PA (US)

( * ) Notice: Subject to any disclaimer, the term of this patent is extended or adjusted under 35 U.S.C. 154(b) by 419 days.

(21) Appl. No.: 13/300,071

(22) Filed: Nov. 18, 2011

(65) Prior Publication Data

US 2012/0156505 A1 Jun. 21, 2012

Related U.S. Application Data

(60) Provisional application No. 61/500,919, filed on Jun. 24, 2011, provisional application No. 61/425,444, filed on Dec. 21, 2010.

(51) Int. Cl.
*B32B 27/40* (2006.01)
*C08G 18/72* (2006.01)
*C09J 175/04* (2006.01)

(52) U.S. Cl.
USPC .............. 428/423.1; 528/60; 528/67; 528/85; 156/331.7

(58) Field of Classification Search
USPC ............ 156/331.7; 528/60, 67, 85; 428/423.1
See application file for complete search history.

(56) References Cited

U.S. PATENT DOCUMENTS

| | | | |
|---|---|---|---|
| 4,405,531 A | 9/1983 | Franz | |
| 4,487,910 A | 12/1984 | Bauriedel | |
| 4,623,709 A | 11/1986 | Bauriedel | |
| 5,998,538 A | 12/1999 | Meckel | |
| 6,007,649 A | 12/1999 | Haas et al. | |
| 6,884,904 B2 * | 4/2005 | Smith et al. | 560/26 |
| 7,019,102 B2 * | 3/2006 | Schoenfeld et al. | 528/45 |
| 7,754,828 B2 | 7/2010 | Shah | |
| 2002/0157789 A1 | 10/2002 | Imai | |
| 2003/0050423 A1 | 3/2003 | Huebener | |
| 2006/0078741 A1 | 4/2006 | Ramalingam | |
| 2010/0010156 A1 | 1/2010 | Kollbach | |
| 2010/0119821 A1 | 5/2010 | Uemura | |
| 2012/0156506 A1 * | 6/2012 | Shah et al. | 428/423.1 |

FOREIGN PATENT DOCUMENTS

| | | |
|---|---|---|
| EP | 0019120 | 11/1980 |
| JP | 2007-284520 A | 11/2007 |
| WO | 2008019215 | 2/2008 |
| WO | 2009147117 A1 | 12/2009 |

OTHER PUBLICATIONS

Kollbach, "Smart Cure Technology From Henkel Achieves Cure and Regulatory Compliance in 3 Days," (http://henkelna.com/us/content_data/119360_smart_cure_paid_white_paper.pdf, downloaded Aug. 18, 2010.

* cited by examiner

*Primary Examiner* — Thao T. Tran
(74) *Attorney, Agent, or Firm* — Carl P. Hemenway

(57) ABSTRACT

There is provided an adhesive composition comprising (a) a polyisocyanate component comprising (i) monomeric 4,4' methylene diphenyl diisocyanate and (ii) an isocyanate functional prepolymer that is the reaction product of a prepolymer reactant mixture comprising (A) monomeric 4,4' methylene diphenyl diisocyanate, and (B) one or more polyol; and (b) a polyol component comprising one or more polyol. Also provided is a method of bonding two or more substrates comprising bringing such an adhesive composition into contact with both of said two or more substrates. Further provided is a bonded assembly comprising two or more substrates bonded together by such an adhesive composition.

9 Claims, No Drawings

ADHESIVE COMPOSITIONS

The following is the background of the invention.

A useful class of adhesive compositions are curable polyurethane adhesive compositions. A useful category of such compositions are solventless two-component compositions.

In such two-component compositions, one component is a polyisocyanate component and the other component is a component that contains one or more compounds with plural active hydrogens. When it is desired to use the two-component composition as an adhesive, the two components are mixed together, and the mixture is brought into contact with two or more substrates.

When the two components of the adhesive composition are first mixed together, it is desirable that the resulting mixture is a fluid with viscosity at 25° C. low enough so that the fluid may easily be applied to a substrate. Usually, soon after a layer of the fluid has been applied to a substrate, a second substrate is brought into contact with that layer to form an assembly. When that assembly is first made, prior to any curing reaction taking place, the adhesive composition does not provide any adhesive bond between the substrates. It is desired that the adhesive composition undergoes a curing reaction after formation of the assembly and forms an adhesive bond between the substrates to form a bonded assembly. It is desirable that the adhesive composition shows good bond strength development. That is, it is desirable that, when a bonded assembly is first formed, the strength of the bond increases rapidly. It is desirable that the bond have good strength at 2 to 8 hours after formation of the bonded assembly. Good bond strength development is important to converters (i.e., those who manufacture bonded assemblies) because good bond strength development allows the converters to subject the bonded assembly to further manufacturing steps without the need to wait a long time for the adhesive composition to cure.

Some two-component adhesive compositions contain one or more monomeric aromatic polyisocyanate compound and one or more polyol. Such compositions are capable of undergoing chemical reactions that form urethane polymers, which are often useful curing reactions. The monomeric aromatic polyisocyanate may eventually react to form polymers and/or crosslinks that strengthen the adhesive bond.

These adhesive compositions are sometimes used to hold together two or more substrates to form a bonded assembly that is part or all of a container that contains food. Even though a curing reaction has taken place, some monomeric polyisocyanate compound may be present in the bonded assembly. The presence of monomeric polyisocyanate compound is considered to be undesirable. One reason for the undesirability of monomeric polyisocyanate compounds is that they are considered to be both toxic and reactive. Another reason for the undesirability of monomeric polyisocyanate compounds is that they are capable of reacting with water to form amines, especially under acidic conditions. Such amines are considered to be undesirable. Among such amines, primary aromatic amines (PAAs) are considered especially undesirable. When a container contains food, it is desired that contact between the container and the food does not result in a situation in which appreciable amounts of any PAAs are present in the food.

The capacity of a bonded assembly to contribute to the presence of PAAs in food is generally tested by exposing the bonded assembly to dilute acetic acid for a time. The dilute acetic acid acts as a "simulant" (i.e., it simulates the action of food). During that time, PAAs that may be present in the bonded assembly may migrate into the simulant. Also during that time, any monomeric aromatic isocyanate compounds in the material under test may migrate into the simulant and react with the simulant to form PAA. Subsequently, the simulant may be analyzed for the total concentration of all PAAs. That concentration is herein called the "PAA level."

It is desirable that a bonded assembly has low PAA level.

In the past, it was common for a bonded assembly that was made using a two-component polyurethane adhesive to have an appreciable amount of monomeric aromatic polyisocyanate present, even after the formation of the bonded assembly and the curing reaction of the adhesive were considered complete. Such a bonded assembly had a high PAA level.

In the past, one approach to providing a bonded assembly with a low PAA level was to make a bonded assembly and then place that bonded assembly in storage prior to using the bonded assembly to make the package that will eventually contain food. The concentration of monomeric polyisocyanate will normally decline while the bonded assembly is in storage. It is thought that water in the atmosphere diffuses into the adhesive and reacts with isocyanate groups. While some of these reactions may result in formation of PAA, most of these reactions will result in formation of urea-type compounds or other relatively innocuous compounds. Therefore, as the isocyanate groups react, the amount of monomeric aromatic polyisocyanate decreases and the PAA level also decreases. In the past, storage times of 14 days or more have often been required before the PAA level becomes acceptably low.

Another approach is taken by US 2010/0010156, which describes an adhesive that leads to bonded multilayer films with reduced proportion of primary aromatic amines. US 2010/0010156 describes a polyurethane adhesive that contains at least one NCO-reactive polyurethane prepolymer and/or polyisocyanates, wherein the polyurethane adhesive contains a low molecular weight compound which contains at least one group reactive with primary amino groups selected from epoxide groups, (meth)acrylic groups or carboxylic anhydride groups.

It is desired to provide a solventless two-component adhesive composition that has (in a relatively short time after formation of the bonded assembly) a desirably low level of PAAs. It is also desirable for the adhesive composition to have desirably low viscosity when the two components are first brought together; and to develop bond strength desirably quickly.

The following is a statement of the invention.

In a first aspect of the present invention, there is provided an adhesive composition comprising
  (a) a polyisocyanate component comprising
    (i) monomeric 4,4' methylene diphenyl diisocyanate and
    (ii) an isocyanate functional prepolymer that is the reaction product of a prepolymer reactant mixture comprising
      (A) monomeric 4,4' methylene diphenyl diisocyanate, and
      (B) one or more polyol comprising:
        (B1) one or more triol having average molecular weight of 1,000 or less, and
        (B2) one or more triol having average molecular weight greater than 1,000;
      wherein the amount of monomeric 2,2' methylene diphenyl diisocyanate in said prepolymer reactant mixture is 1% or less by weight based on the weight of said prepolymer reactant mixture;

wherein the amount of monomeric 2,2' methylene diphenyl diisocyanate in said polyisocyanate component is 1% or less by weight based on the weight of said polyisocyanate component;
and (b) a polyol component comprising one or more polyol.

In a second aspect of the present invention, there is provided a method of bonding two or more substrates comprising bringing the adhesive composition of the first aspect of the present invention into contact with both of said two or more substrates.

In a third aspect of the present invention, there is provided a bonded assembly comprising two or more substrates bonded together by the adhesive composition of the first aspect of the present invention.

The following is a detailed description of the invention.

As used herein, the following terms have the designated definitions, unless the context clearly indicates otherwise.

As used herein, a compound is "volatile" if it has a boiling point at one atmosphere pressure of 100° C. or lower. As used herein, a "solvent" is a volatile compound that is liquid at one atmosphere pressure over a temperature range that includes 15° C. to 20° C. A composition is considered herein to be "solventless" if that composition contains a total of all solvents in the amount of 2% or less by weight, based on the total weight of the composition. As used herein, compositions having solvent in the amount of a certain percentage "or less" includes compositions with zero percent solvent. The "total solids" of a composition is considered herein to be the amount of compounds in the composition that are not volatile, by weight based on the total weight of the composition.

As used herein, a polyisocyanate compound (also known herein as "a polyisocyanate") is a compound that contains two or more isocyanate groups. Polyisocyanate compounds may be monomeric or non-monomeric. An aromatic polyisocyanate is a polyisocyanate that contains one or more aromatic ring. A polyisocyanate that contains no aromatic rings is a non-aromatic polyisocyanate. As used herein, a "polyisocyanate component" is either a polyisocyanate compound or else is a mixture of compounds, where one or more compound in the mixture is a polyisocyanate compound.

As used herein, a "monomeric polyisocyanate" is a compound that has two or more isocyanate groups, that has molecular weight of less than 1,000, and that has no urethane linkage and no urea linkage. Any polyisocyanate that is not a monomeric polyisocyanate is a non-monomeric polyisocyanate.

As used herein, "MDI" is methylene diphenyl diisocyanate, also called diphenylmethane diisocyanate. MDI exists as one of three isomers (4,4' MDI, 2,4' MDI, and 2,2' MDI) or as a mixture of two or more of these isomers. As used herein, unless specifically stated otherwise, "MDI" does not refer to polymeric MDI (sometimes called PMDI). Polymeric MDI is a compound that has a chain of three or more benzene rings connected to each other by methylene bridges, with an isocyanate group attached to each benzene ring.

A compound with plural active hydrogens is an organic compound that has two or more active-hydrogen groups. An active-hydrogen group is a group that has a hydrogen that is connected to an oxygen or a nitrogen. A compound with two or more hydroxyl groups is a polyol. A polyol with exactly two hydroxyl compounds is a diol. A polyol with exactly three hydroxyl groups is a triol. A compound with two or more amine groups is a polyamine. Some compounds with plural active hydrogens have one or more amine group and one or more hydroxyl group.

A compound that contains two or more ether linkages in the same linear chain of atoms is known herein as a polyether. A compound that contains two or more ester linkages in the same linear chain of atoms is known herein as a polyester. A compound that is a polyester and a polyol is a polyester polyol, and a compound that is a polyether and a polyol is a polyether polyol.

It is sometimes useful to characterize a compound by the number of aliphatic carbon atoms it contains. As used herein, an aliphatic carbon atom is a carbon atom that belongs to one of the following types: (i) a carbon atom that has no bond to any atom other than other carbon atoms or hydrogen atoms; and (ii) a carbon atom that has one single bond to one heteroatom selected from oxygen, nitrogen, and sulfur and that otherwise has no bond to any atom other than hydrogen atoms or carbon atoms of category (i).

An alkyl compound that has two or more hydroxyl groups attached to it is known herein as an alkyl polyol; an alkyl polyol has no substituent groups other than hydroxyl groups. All of the atoms in an alkyl polyol are carbon and hydrogen except for the oxygen atoms in the hydroxyl groups.

Some non-monomeric polyisocyanates are reaction products of one or more polyisocyanate with one or more compound with plural active hydrogen compounds, where such reaction products have two or more un-reacted isocyanate groups. Such non-monomeric polyisocyanates may be, for example, the reaction products of one or more polyisocyanate with one or more polyol or the reaction products of one or more polyisocyanate with one or more polyamine or a mixture thereof. A polyisocyanate that is a reaction product of one or more polyisocyanate with one or more compound with plural active hydrogen compounds and that has molecular weight of 1,000 or more is known herein as a prepolymer. Because the prepolymer is a polyisocyanate, it is known herein as an isocyanate functional prepolymer.

A useful method of characterizing the amount of isocyanate groups in a composition is "% NCO," which is the total weight of all isocyanate groups present in the composition, divided by the total weight of the composition, expressed as a percentage.

As used herein, a plasticizer is a compound that has no isocyanate group and that has no active-hydrogen group. To qualify as a plasticizer, a compound must also be soluble at 25° C. in an adhesive composition of the present invention.

As used herein, a "polyurethane" is a compound that contains a linear chain of atoms that contains three or more linkages selected from urethane linkages and urea linkages.

A composition is said herein to "cure" as chemical reactions take place that desirably effect an increase in the molecular weight of the composition and/or effect crosslinking of the composition so as to improve the properties of the composition. Such chemical reactions are known as "curing reactions." The composition is said to be "cured" when such reactions are complete or when the curing reactions have progressed sufficiently far that the properties of the composition are useful and are not appreciably changing over time. A composition that is capable of undergoing one or more curing reaction is a curable composition.

As used herein, when a composition is said to have "little or no" amount of an ingredient, it is meant that the amount of that ingredient is either zero or is 0.1% by weight or less, based on the weight of the composition.

When it is said herein that a certain material is "not soluble" in the liquid portion of an adhesive composition, it is meant that there is no temperature in the range of 20° C. to 50° C. at which that material can be dissolved in the liquid portion of that adhesive composition in the amount of 1% or more by weight, based on the weight of the liquid portion of the adhesive composition.

A polymer film is a structure that is made of a polymer or mixture of polymers and that is 0.5 mm or less in one dimension and is 1 cm or more in both of the other two dimensions. The composition of a polymer film is 80% or more by weight one or more polymer, based on the weight of the film.

When a quantity is described herein as "X to Y," it is meant that the quantity is a number that is greater than or equal to X and also is less than or equal to Y. When a ratio is described herein as "R:1 or greater," it is meant that the ratio is S:1, where S is a number greater than or equal to R. Similarly, when a ratio is described herein as "T:1 or less," it is meant that the ratio is U:1, where U is a number less than or equal to T.

The amount of isocyanate any composition that contains both isocyanate groups and compounds with active hydrogens may usefully be characterized by a quantity herein called "isocyanate index," which is a calculated quantity, based on the ingredients and amounts that are present in the composition. This value is the quotient obtained by dividing the moles of isocyanate groups by the moles of active hydrogens.

The composition of the present invention contains a polyisocyanate component, which contains 4,4' MDI and an isocyanate functional prepolymer. The polyisocyanate component preferably also contains 2,4' MDI. The polyisocyanate component of the present invention either contains no 2,2' MDI or, if some 2,2' MDI is present, the amount of 2,2' MDI is, by weight based on the weight of the polyisocyanate component, 1% or less. Preferably the amount of 2,2' MDI in the polyisocyanate component, by weight based on the weight of the polyisocyanate component, is 0.5% or less; more preferably 0.2% or less; more preferably 0.1% or less.

The polyisocyanate component of the present invention also contains one or more isocyanate functional prepolymer. The reactant mixture that is used for making the isocyanate functional prepolymer is known herein as the prepolymer reactant mixture. The prepolymer reactant mixture preferably contains one or more monomeric polyisocyanate and one or more compound that has plural active hydrogens. The amount of monomeric polyisocyanate in the prepolymer reactant mixture is preferably, by weight based on the weight of the prepolymer reactant mixture, 15% or more; more preferably 25% or more. The amount of monomeric polyisocyanate in the prepolymer reactant mixture is, by weight based on the weight of the prepolymer reactant mixture, 75% or less; or 60% or less.

Preferred prepolymer reactant mixtures have little or no non-aromatic monomeric polyisocyanates. More preferred prepolymer reactant mixtures have no non-aromatic monomeric polyisocyanates. More preferred prepolymer reactant mixtures have no monomeric polyisocyanate other than 4,4' MDI, 2,4' MDI, 2,2' MDI, and mixtures thereof.

The amount of compound having plural active hydrogens in the prepolymer reactant mixture is preferably, by weight based on the weight of the prepolymer reactant mixture, 25% or more; more preferably 40% or more. The amount of compound having plural active hydrogens in the prepolymer reactant mixture is preferably, by weight based on the weight of the prepolymer reactant mixture, 75% or less; more preferably 60% or less.

The prepolymer reactant mixture contains one or more polyol. More preferably, every compound with plural active hydrogens in the prepolymer reaction mixture is a polyol. The amount of triol in the prepolymer reactant mixture is preferably, by weight based on the total weight all polyols in the prepolymer reactant mixture, 25% or more; more preferably 40% or more. The amount of triol in the prepolymer reactant mixture is preferably, by weight based on the total weight all polyols in the prepolymer reactant mixture, 75% or less; more preferably 60% or less.

The prepolymer reactant mixture preferably comprises one or more triol having average molecular weight greater than 1,000. More preferably, the prepolymer reactant mixture comprises one or more triol having average molecular weight greater than 2,500.

The prepolymer reactant mixture preferably additionally contains one or more diol. Preferably, the prepolymer reactant mixture contains one or more diol having average molecular weight of 1,000 or less. Preferably, prepolymer reactant mixture also contains one or more diol having average molecular weight of greater than 1,000. A preferred prepolymer reactant mixture contains B1 (one or more triol having average molecular weight of 1,000 or less); and B2 (one or more triol having average molecular weight of more than 2,000). A more preferred prepolymer reactant mixture contains B1, B2, and B3 (one or more diol having average molecular weight of 1,000 or less). A more preferred prepolymer reactant mixture contains B1, B2, B3, and B4 (one or more diol having average molecular weight of more than 1,000). Preferably, each of B1, B2, B3, and B4 (if present) is either a polyether polyol or a polyester polyol. Preferably, B1 and B2 are both polyether triols.

Polyols may be usefully characterized by their "OH equivalent weight," which is the molecular weight of the polyol divided by the number of hydroxyl groups. A preferred prepolymer reactant mixture contains one or more "low-ew" diol (i.e., a diol having OH equivalent weight of less than or equal to 200; one or more "med-ew" triol (i.e., a triol having OH equivalent weight of 141 to 342), and one "high-ew" triol (i.e., a triol having OH equivalent weight of 1,500 or greater). A more preferred prepolymer reactant mixture contains one or more low-ew polyether diol, one or more med-ew polyether triol, and one or more high-ew polyether triol.

Preferably, in the prepolymer reactant mixture, every compound having plural active hydrogens is a polyol. Preferably, in the prepolymer reactant mixture, every compound that has one or more active hydrogens is a polyol.

The prepolymer reactant mixture contains monomeric 4,4' MDI. Preferably, the prepolymer mixture also contains 2,4' MDI. Preferably, the amount of 2,2' MDI in the prepolymer reactant mixture, by weight based on the weight of all polyisocyanate compounds in the prepolymer reactant mixture, is 0% to 1%; more preferably 0% to 0.5%. Preferably, the amount of 2,4' MDI in the prepolymer reactant mixture, by weight based on the weight of all polyisocyanate compounds in the prepolymer reactant mixture, is 0% to 50%.

Preferably, the isocyanate index of the prepolymer reactant mixture is 2.0 or greater; more preferably 2.5 or greater; more preferably 3.0 or greater. Preferably, the isocyanate index of the prepolymer reactant mixture is 7 or less; more preferably 6 or less; more preferably 5 or less.

The polyisocyanate component of the composition of the present invention contains 4,4' MDI and one or more isocyanate functional prepolymer. The % NCO of the polyisocyanate component is preferably 7% or higher; more preferably 10% or higher. The % NCO of the polyisocyanate compound is preferably 25% or lower; more preferably 17% or lower.

It is useful to characterize the amount of polyisocyanate in the adhesive composition. That amount is the sum of the weights of all polyisocyanate compounds divided by the total weight of the adhesive composition, expressed as a percentage. The preferred amount of polyisocyanate in the adhesive composition of the present invention is 10% or more by weight based on the weight of the adhesive composition. The more preferred amount of polyisocyanate in the adhesive composition of the present invention is, by weight based on the weight of the adhesive composition, 20% or more; more preferred is 30% or more. Also, the preferred amount of polyisocyanate in the adhesive composition of the present invention is 90% or less by weight based on the weight of the adhesive composition; the more preferred amount of polyisocyanate in the adhesive composition of the present invention is, by weight based on the weight of the adhesive composition, 80% or less.

The preferred % NCO of the composition of the present invention is 4% or more; more preferably 6% or more; more preferably 8% or more. The preferred % NCO of the composition of the present invention is 20% or less; more preferably 17% or less; more preferably 14% or less.

The adhesive composition of the present invention contains a polyol component. Preferably, the polyol component contains one or more triol having molecular weight of 100 to 1,000. More preferably the polyol component contains one or more triol having average molecular weight of less than 400 and also contains one or more triol having average molecular weight more than 400.

The total amount of all triols in preferred polyol components, by weight based on the total weight of all polyols present in the polyol component, is 60% to 100%; more preferably 75% to 100%; more preferably 90% to 100%; more preferably 100%.

Preferred polyol components include one or more polyol selected from alkyl polyols, castor oil, polypropylene glycol triols, and mixtures thereof. When an alkyl triol is present, preferred alkyl triols have 3 or more carbon atoms; more preferably 4 or more carbon atoms. When an alkyl triol is present, preferred alkyl triols have 10 or fewer carbon atoms; more preferably 8 or fewer carbon atoms. When an alkyl triol is present, the most preferred alkyl polyol is trimethylol propane. Preferred polyol components contain two or more polypropylene glycol triols, where one or more polypropylene glycol triol has average molecular weight of 400 or lower, and one or more polypropylene glycol triol has average molecular weight above 400.

Preferred adhesive compositions contain little or no compound having plural active hydrogens other than polyols. More preferred adhesive compositions contain little or no compound having plural active hydrogens other than triols.

Compositions of the present invention preferably have isocyanate index of 0.8 or higher; more preferably 0.9 or higher. Compositions of the present invention have isocyanate index of 1.8 or lower; more preferably 1.7 or lower; more preferably 1.6 or lower.

The composition of the present invention is solventless. Preferred compositions of the present invention contain solvent in the amount, by weight based on the weight of the composition, of 1% or less; more preferably 0.5% or less; more preferably 0.2% or less. The total solids of the composition of the present invention is preferably 98% or higher; more preferably 99% or higher; more preferably 99.5% or higher; more preferably 99.8% or higher.

Preferably, every isocyanate compound in the composition of the present invention is contained in the polyisocyanate component. Preferably, every compound in the composition of the present invention that has one or more active hydrogen is contained in the polyol component. Preferred adhesive compositions of the present invention have little or no non-aromatic monomeric polyisocyanates. More preferred adhesive compositions have no non-aromatic monomeric polyisocyanates. More preferred adhesive compositions have no monomeric polyisocyanate other than 4,4' MDI, 2,4' MDI, 2,2' MDI, and mixtures thereof.

In the compositions of the present invention, preferred weight ratio of polyol component to isocyanate component is 0.1:1 or greater; more preferably 0.2:1 or greater; more preferably 0.4:1 or greater. In the compositions of the present invention, preferred weight ratio of polyol component to isocyanate component is 2:1 or less; more preferably 1.2:1 or less; more preferably 0.8:1 or less.

The adhesive composition of the present invention optionally contains one or more plasticizer. When a plasticizer is present, preferred plasticizers have 8 or more aliphatic carbon atoms. When a plasticizer is present, preferred amount of plasticizer is 0.5% to 15% by weight based on the weight of the adhesive composition.

A catalyst such as, for example, a tertiary amine or a tin-based catalyst or a mixture thereof is optionally admixed with the ingredients of the adhesive composition. In preferred embodiments, little or no catalyst is present. In more preferred embodiments, no catalyst is present.

The adhesive composition may be formulated by admixing additional conventional ingredients such as fillers, pigments, tackifiers, plasticizers, rheology modifiers, polymers (including, for example, thermoplastic resins other than those discussed herein above), dehydrating agents (including, for example, silanes), benzoyl chloride, other polyols (including, for example, fatty polyols), ultraviolet indicators, etc. If such additional conventional ingredients are used, they are chosen and used with due regard to the reactivity of the isocyanate groups, which is desirably maintained. If such additional conventional ingredients are used, they may be added, individually or in any combination, to the composition before the other ingredients, after the other ingredients, or during any stage or combination of stages of the formation of the adhesive composition.

In preferred embodiments, the adhesive composition of the present invention contains little or no compound that has one or more reactive group selected from epoxide groups, acrylic groups, methacrylic groups, and carboxylic anhydride groups. More preferred are embodiments in which the adhesive composition of the present invention contains no compound that has one or more reactive group selected from epoxide groups, acrylic groups, methacrylic groups, and carboxylic anhydride groups.

The curable adhesive composition of the present invention undergoes, one or more chemical reaction that desirably effects an increase in the molecular weight of the composition and/or effects crosslinking of the composition so as to improve the properties of the composition.

In embodiments that involve application of the curable adhesive composition of the present invention to at least one substrate, the application is preferably effected by conventional means such as, for example, spray applicator, bead applicator, nozzle, doctor blade, extrusion, or roll coater, to form a continuous or discontinuous film of adhesive, as desired.

The composition may alternatively or additionally be applied to the substrate by hand, for example with a hand-held tool such as, for example, a spatula, hand-held metering device, or other applicator. The composition is preferably applied at a level, in grams per square meter, of 0.5 or greater; more preferably 1 or greater. The composition is preferably applied at a level, in grams per square meter, of 5 or less; more preferably 3 or less.

In some embodiments, the curable adhesive composition of the present invention is used as an adhesive to bond a first substrate to at least one subsequent substrate. In such embodiments, the adhesive composition is applied to a first substrate, and, subsequently or simultaneously, the applied adhesive composition is contacted by at least one subsequent substrate to provide a bonded assembly.

In some of the embodiments in which the curable adhesive composition of the present invention is used as an adhesive to bond a first substrate to at least one subsequent substrate, the structure so formed is optionally subjected to applied pressure such as by passing the structure between rollers to effect increased contact of the substrates with the curable adhesive composition. If such pressure is applied, it may be applied for a relatively short duration or for a relatively long duration; and it may be constant, increasing, decreasing, or a combination thereof. If the structure is at temperature above room temperature, it is then cooled or allowed to cool. If pressure is applied, cooling may take place during application of the pressure, after application of the pressure, or a combination thereof.

In preferred embodiments of the present invention, the adhesive composition of the present invention contains little or no solid polymer that is not soluble in the liquid portion of the adhesive composition of the present invention. More preferred are adhesive compositions that contain no such polymer.

In preferred embodiments of the present invention, the adhesive composition of the present invention contains little or no solid material of any composition that is not soluble in the liquid portion of the adhesive composition of the present invention. More preferred are adhesive compositions that contain no such solid material.

In preferred embodiments, the adhesive composition of the present invention contains little or no acrylic polymer. An acrylic polymer is a polymer in which 25% or more of the polymerized monomer units, by weight based on the weight of the polymer, are selected from acrylic or methacrylic acid, substituted and unsubstituted esters thereof, and substituted and unsubstituted amides thereof. More preferred are embodiments in which the adhesive composition of the present invention contains no acrylic polymer.

In preferred embodiments, the adhesive composition of the present invention contains little or no polymer that is not a polyurethane. More preferred are embodiments in which the adhesive composition of the present invention contains no polymer that is not a polyurethane.

In preferred embodiments, the adhesive composition of the present invention contains little or no compound that has a reactive group other than isocyanate and hydroxyl. More preferred are adhesive compositions that contain no compound that has a reactive group other than isocyanate, hydroxyl, and amine. Still more preferred are adhesive compositions that contain no compound that has a reactive group other than isocyanate and hydroxyl.

In preferred embodiments of the present invention, the curable adhesive composition of the present invention is applied to, or otherwise contacted to, one or more substrates. Some suitable substrates include, for example, wood, metal, plastics, composite materials, fabric (including woven and non-woven), paper, and combinations thereof. Suitable substrates include, for example, natural wood, plywood, lauan wood, particle board, oriented strand board, rigid plastic, flexible plastic, plastic films, plastic foams, and combinations thereof. If more than one substrate is used, any combination of suitable substrates is also suitable. In some embodiments, all the substrates will be made of the same material; in other embodiments, two or more different materials will be used as substrates.

In preferred embodiments, one or more substrates is a polymer film. More preferred are embodiments in which the curable adhesive composition is used to bond together two polymer films. Preferred polymer films contain organic polymer. Preferred organic polymers are polyesters, polyolefins (including copolymers of olefins with other monomers), polyamides, and blends thereof. More preferred organic polymers are polyethylene terephthalate, polyethylene, polypropylene, and nylon.

It is useful to consider embodiments herein called "ordinary cure" embodiments. In ordinary cure embodiments, two polymer films are bonded together to form a laminate, using a curable adhesive composition of the present invention. The curing reaction is allowed to progress to a point in time (herein "T1") at which the adhesive properties are acceptable and at which the adhesive properties do not change appreciably over time. During a process of ordinary cure, it is useful to assess the PAA level as a function of time. Usually, after T1 is reached, the PAA level decreases over time as the laminate is stored. It is desirable that the level of PAA becomes acceptably low in as short a time as possible.

Some types of films allow diffusion of water more readily than other types of films. For some choices of film types, a laminate (prior to the present invention) might have taken 14 days or more, or even 20 days of storage after formation of the laminate before the PAA level was acceptably low. It is contemplated that laminates made with the adhesive composition of the present invention will achieve acceptably low PAA levels in shorter times than comparable previously-known adhesives.

A laminate that is made of two films may be made of two films that are identical to each other or may be made of two films that are different from each other.

A desirable characteristic of curable adhesive compositions is bond strength development. When the moisture-reactive composition is used to bond two substrates together, bond strength development is assessed by measuring the bond strength prior to completion of the curing reaction. In particular, bond strength development is assessed by measuring the bond strength at 2 to 8 hours after formation of the bonded assembly.

The following is a discussion some desirable features of adhesive compositions intended for making laminates. Prepolymers having relatively low content of monomeric polyisocyanate are useful in creating adhesive compositions that produce lower levels of PAAs. However, it is often useful to also consider viscosity (at 23° C.) and the adhesive working time when contemplating a two-component solventless urethane adhesive. Relatively high level of monomeric polyisocyanate serves as a viscosity suppressant in solvent-free urethane prepolymers. Typically the viscosity of useful isocyanate terminated prepolymers with relatively low content of monomeric polyisocyanate is greater than 14,000 mPas at 23° C., as measured by Brookfield Viscometer model DVII+, with #27 spindle at 20 rpm. Useful prepolymers intended for laminating that have relatively high content of monomeric polyisocyanate typically exhibit relatively high mixed viscosities when combined with the polyol component. The higher mixed viscosity limits the application line speed on a commercial solvent-free laminating machine. Pot-life, or working time, is necessary to maintain the proper adhesive wet characteristics during the application process. An appropriate pot-life is considered the time it takes for the viscosity of properly mixed components to double. An appropriate pot-life for two-component laminating adhesives is about 16 minutes or greater at the application temperature. The application temperature of the laminating adhesive should be greater than ambient (i.e., 23° C.) to enable appropriate temperature control, it is set between 40-50° C. for optimum machine control. In order to enable proper application characteristics, the mixed viscosity of the two components is preferably less than 1500 mPas at the application temperature, more preferably at 1200 mPas or less.

It is to be understood that for purposes of the present examples that each operation disclosed herein is performed at 25° C. unless otherwise specified. "Ambient conditions" are approximately 23° C.

The following are examples of the present invention.

The following abbreviations are used:

| Term: | Definition | Term: | Definition |
| --- | --- | --- | --- |
| Abbr. | Abbreviation | MW | average molecular weight |
| MDI | methylene diphenyl diisocyanate | EVA | ethylene vinyl acetate copolymer |
| DEG | diethylene glycol | pbw | parts by weight |
| OHew | OH equivalent weight | Sub1 | Primary Substrate |
| Ingr. | Ingredient | Sub2 | Secondary Substrate |

The following ingredients were used:

| Code | Description |
| --- | --- |
| I-A | Standard Mixture of 4,4' MDI, 2,4' MDI, and 2,2' MDI |
| I-B | Mixture of 4,4' MDI, 2,4' MDI, and 2,2' MDI with reduced level of 2,2' MDI |
| I-C | 98% 4,4' MDI, 2% 2,4' MDI (by weight) |
| P-A | adipate polyester diol, OHew = 860-1125, based on mixed glycols |
| P-B | Polyether triol, OHew = 1400-1900 |
| P-C | Polyether triol, OHew = 220-250 |
| P-D | DEG adipate polyester diol, OHew = 400-535 |
| P-E | Polyether diol, OHew = 200-225 |
| P-F | Castor Oil |
| P-G | Polyether triol, OHew = 82-88 |
| P-H | Polyether triol, OHew = 140-155 |
| P-I | trimethylol propane (TMP) |
| P-M | adhesion promoter |
| OPA | 85% by weight solution of orthophosphoric acid in water |
| Z-1 | di-isononyl ester of 1,2 cyclohexane dicarboxylic acid |

The following film substrates were used.

| Code | Composition of film | Thickness (micrometers) |
| --- | --- | --- |
| PET | polyester | 12 |
| PE | polyethylene | 80 |
| coexPP | coextruded polypropylene | 20 |
| metPP | metallized coextruded polypropylene | 20 |
| Nylon | nylon | 15 |
| PE-E | vinyl acetate modified polyethylene | 50 |
| Foil | prelaminated aluminum foil | |

EXAMPLE 1

Preparation of Adhesive Composition

Materials for the prepolymer were as follows:

| Ingredient: | I-C | I-B | P-A | P-B | P-C | P-D | P-E |
| --- | --- | --- | --- | --- | --- | --- | --- |
| pbw: | 20.7 | 30.9 | 10.1 | 21.9 | 1.8 | 3.5 | 11.1 |

Preparation of prepolymer (isocyanate component): Nitrogen sweep of 0.5 m³/hr was maintained. Reactor temperature was 35° C. I-A and I-B were added, and the agitator was started and run at approximately 62 rpm. One at a time, polyols were added in order as follows: P-A, P-B, P-C, P-D, and P-E. The reactor was held at 80° C. to 84° C., using cooling if necessary, for 2.5 hours. Product was placed under a nitrogen blanket in a closed container.

Materials for the polyol component were as follows:

| | Ingredient: | | | |
| --- | --- | --- | --- | --- |
| | Castor Oil | P-F | P-G | TMP |
| pbw: | 61 | 15 | 20 | 4 |

Preparation of the polyol component: Nitrogen sweep as above was maintained in the reactor. Castor oil was placed into the reactor, and the agitator was turned on an set to 60-65 rpm. P-F, P-G, and TMP were added. The reactor was set to 80° C. to 84° C. The reactor was sealed and the nitrogen sweep was shut off. The reactor was held at 80° C. to 84° C. for 60 minutes. Products were placed under a nitrogen blanket in a closed container.

Adhesive composition was prepared by mixing 100 pbw of isocyanate component with 45 pbw of the polyol component.

EXAMPLE 2C

Preparation of Comparative Adhesive

The polyisocyanate component was prepared as in Example 1, using the following ingredients:

| Ingredient: | I-C | I-A | P-A | P-B | P-C | P-D | P-E |
| --- | --- | --- | --- | --- | --- | --- | --- |
| pbw: | 20.7 | 30.9 | 10.1 | 21.9 | 1.8 | 3.5 | 11.1 |

The polyol component was prepared as in Example 1, using the following ingredients:

| | Ingredient: | | | |
| --- | --- | --- | --- | --- |
| | Castor Oil | P-F | P-G | TMP |
| pbw: | 61 | 15 | 20 | 4 |

The polyisocyanate component and the polyol component were mixed as in Example 1.

EXAMPLE 3

Laminates were Prepared as Follows

Immediately after combining the polyisocyanate component with the polyol component, the adhesive (at ambient temperature) was then fed on Polytype™ roll coater (metered rolls set at 40° C. to 45° C.). Mixed adhesive was then applied to in line corona treated primary web at the coverage of 1.6 to 2.2 grams per square meter or 1 to 1.2 lbs. per ream, and then adhesive coated primary web was mated to secondary web and then this laminated film was nipped and wound on the finish roll on Polytype™ laminator. Preparation of laminate for bond data: After appropriate curing time, 15 mm wide strip was cut from the finished roll and bond data was generated on Instron™ tensile tester using separation speed of 100 mm/minute (4 inches/minute). Results are reported as grams of force required to peel the laminate apart (abbreviated as "f(g)").

EXAMPLE 4

Testing

Laminates for PAA testing were prepared as described above. Primary substrate was nylon, and the secondary substrate was EVA modified PE. EVA modified PE is chosen for PAA testing because EVA modified PE is more porous to undesirable migratory species than PE without VA modification. Laminates made with substrates other than EVA modified PE generally exhibit faster PAA decay than do laminates made with EVA modified PE. Therefore, if a laminate is made with a certain adhesive composition, has at least one substrate that is EVA modified PE, and shows acceptably fast PAA decay, then other laminates made with that same certain adhesive composition are also likely to show PAA decay that is at least fast enough to be acceptable.

PAA level was measured as follows. After cure on the laboratory bench at approximately 23° C. and 50% relative humidity for 7 days, PAA was measured. Laminates were exposed to simulant (3% acetic acid in water by weight) for 2 hours at 70° C. PAAs in the simulant were derivatized by diazotization so that the concentration of PAAs could be determined colorimetrically. The concentration of PAAs is reported as aniline hydrochloride equivalents, as micrograms of aniline hydrochloride per 100 ml of simulant. The procedure was as follows. All solutions are aqueous. 100 ml of simulant was mixed with 12.5 ml of hydrochloric acid solution (1N) and 2.5 ml of sodium nitrite solution (0.5 g per 100 ml of solution) and was allowed to react for 10 minutes. 5 ml of ammonium sulfamate (2.5 g per 100 ml of solution) was added and allowed to react for 10 minutes. 5 ml of coupling reagent (1 g of N-(1-naphtyl)-ethylenediamine dihydrochloride per 100 g of solution) was added and allowed to react for 120 minutes. The solution was concentrated by elution through an ODS solid phase extraction column, and the extinction coefficient was measured at 550 nm. To determine the concentration of PAA, the extinction coefficient was compared with the extinction coefficients of blank samples and a variety of samples with known concentration of aniline hydrochloride.

Tensile tests were performed using ASTM D1876 (ASTM International, West Conshohocken, Pa., USA). Separation speed was 100 mm/min, and sample width was 15 mm. Bond data reported is the average of two specimens tested under appropriate condition. The force required to separate the substrates at 3 to 8 hours is considered to be a measure of the "bond strength development" of the laminate. "FF" means that the substrate failed; that is, the layer of adhesive composition and the bond between adhesive composition and substrate were stronger than the substrate itself.

Results of PAA Analysis:

| Laminate | PAA level[2] |
|---|---|
| Comparative 2C | 3.8 |
| Example 1 | 0.49 |

Note (2): microgram Aniline HCl/100 ml of simulant

The Example of the present invention showed far less PAA than the comparative example.

Results of tensile testing was as follows. Times shown are the length of the interval from formation of the laminate until testing.

| | | | bond strength g/15 mm | | | |
|---|---|---|---|---|---|---|
| Sub1 | Sub2 | Example No. | 3 hr | 4 hr | 5 hr | 6 hr |
| PET | PE | 1 | 150 | 261 | 323 | 432FF |
| coexPP | metPP | 1 | 27 | 96 | 137 | 140 |
| nylon | PE | 1 | 67 | 215 | 386FF | 392FF |

For each type of laminate, the Example 1 of the present invention showed good bond strength development.

EXAMPLE 5

Preparation of Adhesive Composition

Prepolymer was made as in Example 1. Materials for the prepolymer were as follows:

| Ingredient | I-C | I-B | P-D | P-A | P-E | P-C | P-B | Z-1 |
|---|---|---|---|---|---|---|---|---|
| pbw: | 18.4 | 28.8 | 3.7 | 10.1 | 11.1 | 1.8 | 21.9 | 4.2 |

The polyol component was made as in Example 1. Materials for the polyol component were as follows:

| | Ingredient: | | | |
|---|---|---|---|---|
| | P-C | P-H | P-G | OPA |
| pbw: | 66.7 | 21.5 | 11.6 | 0.2 |

The adhesive composition was prepared by mixing 100 pbw of isocyanate component with 35 pbw of the polyol component.

EXAMPLE 6C

Preparation of Comparative Adhesive Composition

Prepolymer was made as in Example 1. Materials for the prepolymer were as follows:

| Ingredient | I-A | I-C | P-D | P-A | P-E | P-C | P-B | Z-1 |
|---|---|---|---|---|---|---|---|---|
| pbw: | 28.8 | 18.4 | 3.46 | 10.1 | 11.1 | 2.07 | 21.9 | 4.15 |

The polyol component was made as in Example 1. Materials for the polyol component were as follows:

| | Ingredient: | |
|---|---|---|
| | P-H | P-M |
| pbw: | 99 | 1 |

The adhesive composition was prepared by mixing 100 pbw of isocyanate component with 35 pbw of the polyol component.

EXAMPLE 7

Measurements of Example 5 and Comparative Example 6C

PAA results were as follows:

| Laminate | PAA[2] |
|---|---|
| Example 5 | 0.36 |
| Comparative Example 6C | 1.35 |

Note (2): microgram Aniline HCl/100 ml of simulant

Example 5 showed much lower PAA than Comparative Example 6C. It is considered that the difference in PAA between the two samples is due to the difference in the MDI isomers that were used in the two different polyisocyanate components.

Additionally, Sample 5 had acceptable bond strength development. Laminates were made and tested, using Example 5 as the adhesive. After appropriate curing time, 2.54 cm (one inch) wide strip was cut from the finished roll and bond data was generated on Instron™ tensile tester using separation speed of 25.4 cm/minute (10 inches/minute). Results are reported as grams of force required to peel the laminate apart (abbreviated as "f(g)"). Failure modes are reported as follows:

Sub=substrate failure

Coh=cohesive failure; adhesive composition remains on both substrates

At=adhesive transfer

Results shown were measured at the time intervals shown after the laminate was made and then stored at approximately 23° C. Units are grams of force to peel the sample that was 2.54 cm (1 inch) in width.

| | | | Peel Force at Various Time Intervals | | | | |
|---|---|---|---|---|---|---|---|
| Sub1 | Sub2 | | 3 hrs | 8 hrs | 24 hrs | 7 days | 14 days |
| foil | PE | f(g) | 61 | 554 | 1234 | 731 | 638 |
| | | mode | Coh | Coh | Sub | At | At |
| PET | PE | f(g) | 207 | 1102 | 2771 | 2546 | 2712 |
| | | mode | Coh | Sub | Sub | Sub | Sub |

Both laminates showed good bond strength development.

We claim:

1. An adhesive composition comprising
(a) a polyisocyanate component comprising
   (i) monomeric 4,4' methylene diphenyl diisocyanate and
   (ii) an isocyanate functional prepolymer that is the reaction product of a prepolymer reactant mixture comprising
      (A) monomeric 4,4' methylene diphenyl diisocyanate, and
      (B) one or more polyol comprising,
         (B1) one or more triol having average molecular weight of 1,000 or less, and
         (B2) one or more triol having average molecular weight greater than 1,000;
   wherein the amount of monomeric 2,2' methylene diphenyl diisocyanate in said prepolymer reactant mixture is 0.5% or less by weight based on the weight of all polyisocyanate compounds in said prepolymer reactant mixture;
   wherein the amount of monomeric 2,2' methylene diphenyl diisocyanate in said polyisocyanate component is 1% or less by weight based on the weight of said polyisocyanate component; and
(b) a polyol component comprising one or more polyol.

2. The adhesive composition of claim 1, wherein said polyol component comprises one or more triol having average molecular weight of 100 to 1,000.

3. The adhesive composition of claim 1, wherein said prepolymer reactant mixture further comprises 2,4' methylene diphenyl diisocyanate.

4. The adhesive composition of claim 1, wherein every compound having plural active hydrogens in said prepolymer reactant mixture is a polyol.

5. The adhesive composition of claim 1, wherein the total weight of all triols in said prepolymer reactant mixture is 25% to 75%, based on the total weight of all polyols in said prepolymer reactant mixture.

6. The adhesive composition of claim 1, wherein said polyol component comprises one or more triol having average molecular weight of less than 400 and one or more triol having average molecular weight of more than 400.

7. The adhesive composition of claim 1, wherein the total weight of all triols in said polyol component is, by weight based on the weight of all polyols in said polyol component, 60% to 100%.

8. A method of bonding two or more substrates comprising bringing the adhesive composition of claim 1 into contact with both of said two or more substrates.

9. A bonded assembly comprising two or more substrates bonded together by the adhesive composition of claim 1.

* * * * *